Patented June 24, 1952

2,601,646

UNITED STATES PATENT OFFICE 2,601,646

POLYESTERS OF DICARBOXYPHENYLDIMETHYLSILANE

Leslie J. Tyler, Midland, Mich., assignor to Dow Corning Corporation, Midland, Mich., a corporation of Michigan No Drawing. Application July 5, 1949, Serial No. 103,170

4 Claims. (Cl. 260—75)

This invention relates to polyesters of carboxyphenylsilanes and polyhydric alcohols.

It is an object of this invention to prepare novel compositions of matter of the polyester type which are useful as coating compositions for glass and for electrical conductors and as paint vehicles.

This invention relates to polyesters of dicarboxyphenyldimethylsilane and polyhydric alcohols selected from the group consisting of ethylene glycol, glycerol and bis-hydroxymethyldimethylsilane, wherein the silane polymer units are linked to the alcohol polymer units by

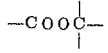

linkages. In the polyester the proportion of alcohol to silane varies from one mol of alcohol per three mols of silane to one mol of alcohol per 0.306 mols of silane.

The preparation of dicarboxyphenyldimethylsilane is more fully described in the applicant's copending application filed concurrently herewith, now Patent No. 2,517,146. The silane may conveniently be prepared by making a Grignard reagent of dibromophenyldimethylsilane and thereafter carbonating the organomagnesium compound and then acidifying the material.

Ethylene glycol and glycerol are well-known products. Bis-hydroxymethyldimethylsilane may be prepared according to the method of John L. Speier, Journal American Chemical Society, vol. 70, page 1400 (1948).

The polyesters of this invention are prepared by mixing the silane and the alcohols and thereafter heating the mixture at a temperature from 90° C. to 200° C. Reaction takes place between the carboxyl groups of the silane and the alcohol hydroxyl groups to produce polyesters with the elimination of water. If desired, small amounts of strong acids may be employed as catalysts for the reaction. When catalysts are employed, reaction temperatures below 90° C. are feasible. When the reaction temperature is below 100° C., it is desirable to employ reduced pressure in order to facilitate the removal of water.

The polyesters of this invention may be fluids, thermoplastic resins or infusible thermoset gels. The type of product obtained varies with the degree of functionality of the reactants employed and the proportions of the reactants.

When both of the reactants are difunctional, the polymers will be liquids or thermoplastic solids. When the silane is reacted with glycerol in approximately equimolar amounts, a cross-linked infusible gel may be obtained.

The polyester materials herein described withstand temperatures in excess of 165° C. without deterioration. They show excellent adhesion to glass and to metals and have good weathering characteristics. This combination of properties render the materials applicable for use as paint vehicles both at natural temperatures and at elevated temperatures.

The polyesters containing an excess of either hydroxyl or carboxyl groups may be modified by reacting them with other hydroxyl, carboxyl or amino containing materials.

The following examples are illustrative only.

Example 1

1 g. of dicarboxyphenyldimethylsilane

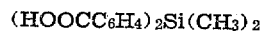

was mixed with 1 g. of bis-hydroxymethyldimethylsilane and heated at 135° C. for 2 hours. The resulting polyester was a viscous oil.

A sample of the polyester was placed on a glass slide and heated 3 hours at 160° C. The liquid polymerized to a thermoplastic solid which was hard and tough and strongly adherent to glass.

Example 2

1.5 g. of dicarboxyphenyldimethylsilane, 0.6 g. of bis-hydroxymethyldimethylsilane and 0.6 g. of glycerol were mixed and heated at 135° C. for 3 hours. The resulting polyester was a light brown, opaque, thermoplastic material. A sample of the polyester was heated at 160° C. for 3 hours on a glass slide. A thermoplastic resinous material was obtained.

Example 3

1.5 g. of dicarboxyphenyldimethylsilane and 1.5 g. of glycerol were mixed and heated at 135° C. for 4 hours and at 160° C. for 1½ hours. The resulting polyester was a soft thermoplastic solid. A sample of the polyester was heated on a glass slide at 160° C. for 3 hours whereupon a hard, tough, thermoplastic resin was obtained.

Example 4

1.5 g. of dicarboxyphenyldimethylsilane and 1 g. of ethylene glycol were mixed and heated 2 hours at 135° C. and 1½ hours at 160° C. The resulting polyester was a soft, thermoplastic solid which melted to a clear liquid below 160° C. A sample of the polyester was placed on a glass slide and heated 3 hours at 160° C. whereupon a hard, brittle, thermoplastic resin was produced.

That which is claimed is:

1. A polyester composed of the esterification product of dicarboxyphenyldimethylsilane and a polyhydric alcohol selected from the group consisting of ethylene glycol, glycerol, and bis-hydroxymethyldimethylsilane, in which polyester the proportion of alcohol to dicarboxyphenyldimethylsilane is from one mol of alcohol per three mols of dicarboxyphenyldimethylsilane to one mol of alcohol per 0.306 mol of dicarboxyphenyldimethylsilane.

2. A polyester in accordance with claim 1 in which the alcohol is ethylene glycol.

3. A polyester in accordance with claim 1 in which the alcohol is glycerol.

4. A polyester in accordance with claim 1 in which the alcohol is bis-hydroxymethyldimethylsilane.

LESLIE J. TYLER.

REFERENCES CITED

The following references are of record in the file of this patent:

UNITED STATES PATENTS

| Number | Name | Date |
|---|---|---|
| 1,970,510 | Ellis | Aug. 14, 1934 |